UNITED STATES PATENT OFFICE.

CHARLES BURROWS MOREY, OF BUFFALO, NEW YORK, ASSIGNOR TO LARKIN CO., OF BUFFALO, NEW YORK.

METHOD OF TREATING CATALYZING MATERIALS.

1,127,911.      Specification of Letters Patent.      Patented Feb. 9, 1915.

No Drawing.     Application filed March 2, 1914. Serial No. 821,939.

*To all whom it may concern:*

Be it known that I, CHARLES B. MOREY, a citizen of the United States, residing at Buffalo, in the county of Erie and State of New York, have invented a new and useful Improvement in Methods of Treating Catalyzing Materials, of which the following is a specification.

This invention has the object to greatly diminish or entirely suppress the tendency of catalytic materials to heat or take fire on exposure to oxygen, air or other gases containing oxygen, which tendency or property is usually referred to as the pyrophoric tendency or property of catalyzers.

In practising this invention the catalyzer or catalytic material is exposed to a partial vacuum for a sufficient length of time to practically remove the occluded gas which is absorbed by or associated with the particles of catalytic material. Exposure to a partial vacuum, which is preferably as complete as circumstances will permit it to be made, causes the occluded gases to leave the particles of catalytic material and if this exposure is maintained for a sufficient length of time the catalytic substance is rendered practically free from occluded gas and capable of being exposed to oxygen, air or other gases containing oxygen without developing undesirable pyrophoric action.

This method can be applied to the various catalytic metals, such as finely divided or powdered nickel, cobalt, platinum and the like, or to mixtures of the same, or to compounds comprising such metals and inert material, such as kieselguhr, fullers' earth, infusorial earth, pumice stone, and the like. The catalytic material is placed in an airtight vessel or chamber which is connected with an air pump or other suitable exhausting means, so that a partial vacuum, more or less complete, can be produced in the vessel. The air pump can be operated continuously or intermittently, as may be preferred. A satisfactory practice is to operate the pump until the partial vacuum in the vessel has attained the practical limit which the pump can produce. The vessel is then sealed by closing a stop cock in the pipe or passage leading to the pump, or by other suitable means. The catalyzer is allowed to remain under this reduced pressure for a number of hours, preferably as long as twelve hours, during which time the occluded gas gradually leaves the catalyzer and the latter becomes practically non-pyrophoric. If desired, however, the period of rest may be shortened to about three hours and the pump be operated again to remove as far as practicable the gas which has become liberated during the period of rest, and this second operation of the pump may be followed by another period of rest. These alternating periods of exhaustion and rest may be repeated until the desired effect has been produced. In some cases it is desirable to admit air or some other inert gas, for instance, nitrogen, to the vacuum vessel at the end of the period of rest and to exhaust the vessel again. The gas so admitted to the vacuum vessel or chamber mingles with the liberated gas in the vessel and facilitates the removal of the rest of the occluded or liberated gas. The desired non-pyrophoric condition has been produced when a sample of the material under treatment does not heat when exposed to the atmosphere.

The separation of the occluded gas from the catalytic material can be expedited and improved by heating the material during the described vacuum treatment. This heating can be effected by any suitable source of heat, for instance, by steam in a steam jacket surrounding the vacuum vessel or chamber, or by an electric heater attached to the vessel.

I claim as my invention:

1. The method of rendering pyrophoric catalytic material non-pyrophoric which consists in exhausting the space in which such material is contained.

2. The method of rendering pyrophoric catalytic material non-pyrophoric which consists in exhausting the space in which such material is contained and applying heat to the catalytic material.

3. The method of rendering pyrophoric catalytic material non-pyrophoric which consists in intermittently exhausting the space in which such material is contained with intervening periods of rest.

4. The method of reducing the pyrophoric property of a catalytic material which consists in exhausting the space in which said material is contained, thereafter admitting an inert gas to said space and then again exhausting said space.

5. The method of reducing the pyrophoric property of a catalytic material which consists in subjecting such material to the successive action of a partial vacuum, a period of rest and an admitted inert gas.

6. The method of reducing the pyrophoric properties of a catalytic material which consists in subjecting such material, while heat is applied, to the successive action of a partial vacuum, a period of rest, and an admitted inert gas.

Witness my hand in the presence of two subscribing witnesses.

CHARLES BURROWS MOREY.

Witnesses:
S. E. CLIFT,
FREDERIC W. CLAUS.